(12) United States Patent
Bonnet

(10) Patent No.: US 7,241,971 B2
(45) Date of Patent: Jul. 10, 2007

(54) LASER/ARC HYBRID WELDING PROCESS FOR FERRITIC STEELS

(75) Inventor: Christian Bonnet, Puiseux-Pontoise (FR)

(73) Assignees: L'Air Liquide, Société Anonyme À Directoire et Conseil de Surveillance pour L'Étude et L'Exploitation des Procedes Georges Claude, Paris (FR); La Soudure Autogène Francaise, Paris (FR)

( * ) Notice: Subject to any disclaimer, the term of this patent is extended or adjusted under 35 U.S.C. 154(b) by 57 days.

(21) Appl. No.: 11/039,605

(22) Filed: Jan. 20, 2005

(65) Prior Publication Data
US 2005/0155960 A1 Jul. 21, 2005

(30) Foreign Application Priority Data
Jan. 21, 2004 (FR) .................. 04 50108

(51) Int. Cl.
*B23K 9/173* (2006.01)
*B23K 9/23* (2006.01)
*B23K 35/22* (2006.01)
*B23K 26/00* (2006.01)

(52) U.S. Cl. .............. 219/137 WM; 219/146.1; 219/74; 219/121.64

(58) Field of Classification Search ....... 219/137 WM, 219/146.1, 121.63, 121.64, 74
See application file for complete search history.

(56) References Cited

U.S. PATENT DOCUMENTS

| 4,689,467 A | 8/1987 | Inoue ...................... 219/121.6 |
| 5,744,782 A * | 4/1998 | Sampath et al. ......... 219/146.1 |
| 6,124,569 A | 9/2000 | LeDuey et al. .......... 219/146.1 |
| 6,683,268 B2 * | 1/2004 | Briand et al. ................. 219/61 |

FOREIGN PATENT DOCUMENTS

| DE | 40 06 167 | | 5/1991 |
| JP | 2002-302735 A | * | 10/2002 |

OTHER PUBLICATIONS

France Search Report for PCT/FR/0450108, Sep. 7, 2004.

* cited by examiner

*Primary Examiner*—Kevin P. Kerns
(74) *Attorney, Agent, or Firm*—Christopher C. Cronin

(57) ABSTRACT

A method and an apparatus for a hybrid laser beam and electric arc welding process. A laser beam, an electric arc, a shielding gas and a consumable welding wire are used to create a weld on a steel work piece by melting the welding wire. The weld contains 30 to 1000 ppm titanium by weight, at least 0.7% manganese by weight, 50 to 1000 ppm oxygen by weight, and less than 10% nickel. The welding wire is either solid welding wire or cored welding wire, and may contain, in varying percentages: titanium, manganese, iron, nickel, boron, molybdenum, carbon or chromium.

20 Claims, 2 Drawing Sheets

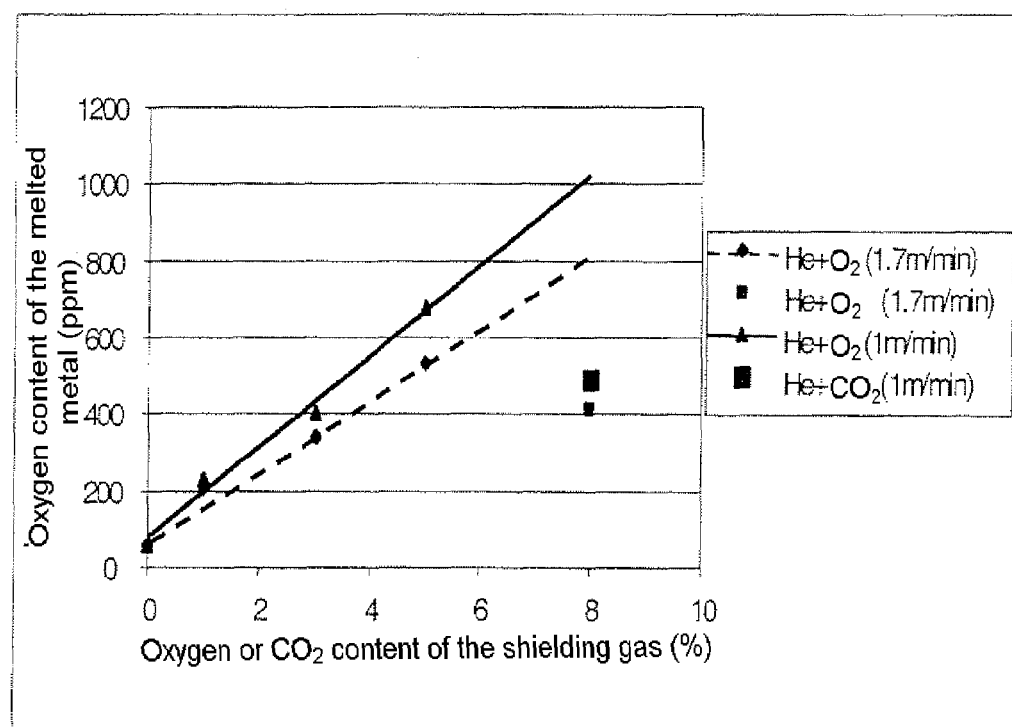
Figure 1
Figure 3
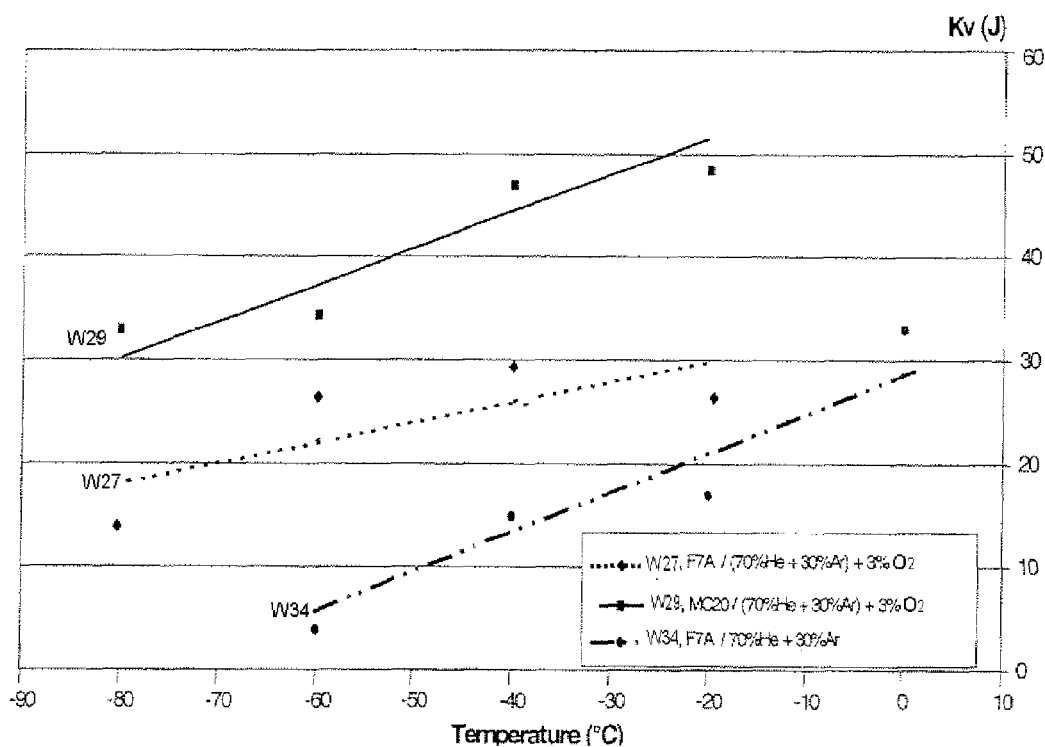

LASER/ARC HYBRID WELDING PROCESS FOR FERRITIC STEELS

This application claims the benefit of priority under 35 U.S.C. §119 (a) and (b) 1 to French Application No. 04 50108, filed Jan. 21, 2004, the entire contents of which are incorporated herein by reference.

BACKGROUND

The present invention relates to a laser/arc hybrid welding process for ferritic steels using a filler wire and to a weld obtained with such a hybrid process, that is to say a welding process that simultaneously employs an electric arc and a laser beam, these being combined with each other.

Welds produced by laser/arc hybrid welding on ferritic steels, such as C-Mn steels defined by the EN 10025 standard, microalloyed steels defined by the EN 10113 standard or else "quenched and tempered" steels according to the EN 10137 standard, usually have poor resilience properties, or more generally poor low-temperature toughness, in the melted metal, and also hardness values in this same zone that are very much higher than those of the base metals.

These mediocre metallurgical properties very greatly limit the extension of laser/arc hybrid welding to certain fields in industry, in particular in the naval construction field, the field of the manufacture and laying of pipes for transporting oil products, the offshore field, etc.

This problem results from the fact that such steels have been chemically balanced in order to give them the intended mechanical properties, taking into account their production process, that is to say the subsequent rolling and cooling conditions, or else the heat treatment that they undergo during their manufacture, for example in the form of sheet or plate or tube.

In fact, the mechanical properties of a steel result, in part, from its chemical composition but for a larger part from its microstructure.

The microstructure of a steel, and likewise of a weld, that is to say of the melted metal formed by deposited metal and base metal that has melted during production of the weld, develops from the high-temperature austenitic state during cooling down to the ambient temperature.

Consequently, for a given chemical composition, this microstructure and consequently the mechanical properties of the steel (or of the weld) depend on the cooling conditions.

If we consider for example a steel containing about 0.12% carbon by weight, with a low cooling rate, its structure is essentially composed of ferrite, that is to say iron atoms stacked in a body-centred cubic crystallographic structure, and of a small percentage (typically around 13%) of pearlite, that is to say alternating lamellae of ferrite and cementite, which is iron carbide $Fe_3C$ containing 6.66% carbon. Its Vickers hardness is then about 130 and its tensile strength is around 400 to 500 MPa.

However, this same steel will have a martensitic structure, that is to say a supersaturated solid solution of carbon in the body-centred cubic iron, and a Vickers hardness of around 400, while its tensile strength will be 1300 to 1400 MPa if it undergoes extremely rapid cooling from the austenitic (high temperature) state.

For cooling rates between these two extremes, mixed structures, composed of martensite, lower bainite, upper bainite and ferrite+pearlite, to which intermediate mechanical properties correspond, will develop.

Continuous cooling transformation (or CCT) diagrams, which are well known to metallurgists, indicate the various microstructures that develop and also hardnesses that correspond thereto depending on the cooling rate for a given steel and the standard austenization conditions for this steel, namely the temperature (generally 50° C. above the point for complete transformation to austenite) and the austenizing time (generally 30 minutes).

Such diagrams also show that, for a given steel, the difference in mechanical properties between the martensitic structure and the ferrite+pearlite structure is greater the higher its carbon content. They also show, if the diagrams for steels of various compositions are compared, that the cooling rates that generate the abovementioned various microstructures depend on all of the alloying elements of the steel.

This is because all the alloying elements have an impact on hardenability, that is to say the ability of a steel to acquire a fully martensitic structure, and therefore also on the critical quenching rate, which is the minimum cooling rate from the austenitic state that allows a 100% martensitic structure to be obtained.

The carbon content, in addition to affecting the hardenability, also determines the mechanical properties of the various structures.

Laser/arc hybrid welding processes, because of the high power density associated with them and the high welding speeds that they allow to be achieved, which are often higher than in laser welding alone, result in very rapid cooling rates.

It therefore follows that, with ferritic steels, the microstructure of the weld is very different from that of the base metal, which results, in this zone, in hardness and tensile properties that are much higher than those of assembled steels, but also in a ductility and a toughness of the weld that are too low for many applications.

This effect may be alleviated by the addition of a filler metal in the form of a "cold" wire, that is to say a welding wire paid out in the sheet joint plane immediately upstream of the impact of the laser beam and of the arc employed in laser/TIG or plasma hybrid welding, or in the form of a consumable electrode wire when the process is a laser/MIG or MAG hybrid process.

In fact, by proceeding in this manner, the aim is to adjust the hardenability of the melted metal usually by reducing its content of alloying elements relative to the base metal(s), but also, in the case of very mild steels, that is to say those having a yield strength of less than 240 or 280 MPa, by increasing it.

In both cases, the aim is to adjust the hardenability of the melted metal so that, under the effect of the thermal cycle caused by the hybrid welding, it develops a less brittle microstructure.

However, it is often insufficient to proceed in this manner since, with hybrid laser welding processes, the proportion of filler metal in the melted metal is very often around 20% by weight and very rarely exceeds 40% by weight, which means that, even when using commercially available wires containing the least amount of alloying elements, that is to say wires containing 0.5% manganese by weight for example, the hardenability of the melted metal cannot be lowered sufficiently to prevent the formation of hard and brittle structures in the case of steels which, without this addition, already result in a hard and brittle structure.

Moreover, in the case of very mild steels for which it may be desirable to increase the hardenability, in order to avoid the formation of a coarse and brittle structure, the addition of a wire having a higher content of alloying elements than the metal to be welded, so as to obtain a finer structure in the melted metal, does not appear to be a satisfactory solution either, since this refinement of the structure is accompanied by a substantial increase in the hardness and thereby results only in a small reduction in brittleness.

The problem that therefore arises is how to improve laser/arc hybrid welding processes so as to be able to obtain welds whose mictrostructure is virtually free of hard brittle microconstituents, that is to say those having improved properties in terms of resilience, and more particularly in terms of toughness, and also tensile properties compared with those of the base metals, especially an increased elongation, a lower tensile strength and a lower yield strength, while still remaining higher than those of assembled materials.

SUMMARY

Put another way, the invention aims to improve the properties of welds obtained by laser/arc hybrid welding with supply of consumable wire and assistance gas.

The solution of the invention is a hybrid welding process employing a laser beam combined with an electric arc, with a supply of consumable welding wire and shielding gas, in which the said wire is melted by the said laser beam and/or the said electric arc so as to produce a weld on at least one steel workpiece to be welded, characterized in that the said weld contains 30 to 1000 ppm titanium by weight, at least 0.7% manganese by weight, 50 to 1000 ppm oxygen by weight and less than 10% nickel.

The invention also relates to a solid or cored welding wire, that can be used in the laser/arc hybrid welding process, which comprises 100 to 10,000 ppm titanium, 50 to 5000 ppm oxygen, up to 1500 ppm boron, with the balance essentially consisting of iron.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 illustrates the relationship, according to one embodiment of the current invention, between the oxygen content of the melted metal and either the oxygen or the carbon dioxide content of the shielding gas;

FIG. 3 illustrates, according to one embodiment of the current invention, the improvement in weld toughness as the oxygen content of the melted metal increases.

DESCRIPTION OF PREFERRED EMBODIMENTS

Figure 2:
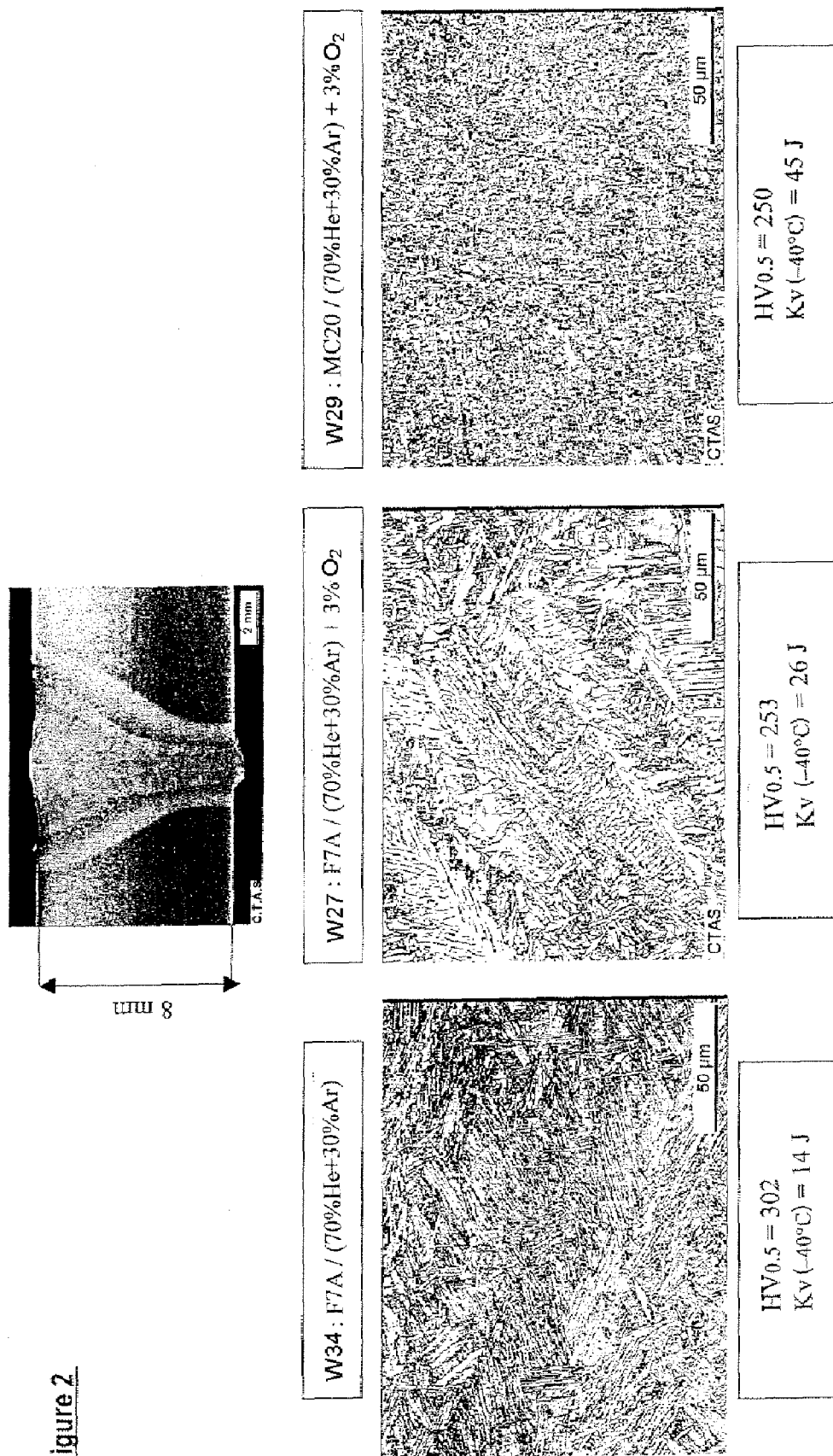
FIG. 2 illustrates the metallurgical structure of welds created by an embodiment of the current invention.

The solution of the invention is a hybrid welding process employing a laser beam combined with an electric arc, with a supply of consumable welding wire and shielding gas, in which said wire is melted by said laser beam and/or said electric arc so as to produce a weld on at least one steel workpiece to be welded, characterized in that the said weld contains 30 to 1000 ppm titanium by weight, at least 0.7% manganese by weight, 50 to 1000 ppm oxygen by weight and less than 10% nickel.

Depending on the case, the process of the invention may include one or more of the following technical features:

the workpiece or workpieces are made of ferritic steel;

the weld has a microstructure of acicular ferrite type;

the weld comprises 30 to 800 ppm titanium and/or 100 to 450 ppm oxygen, preferably 50 to 500 ppm titanium and/or 120 to 350 ppm oxygen;

the weld comprises 0.7 to 2% manganese by weight and/or less than 1500 ppm aluminium by weight, preferably 0.8 to 1.7% manganese and/or less than 500 ppm aluminium, and even more preferably less than 300 ppm aluminium;

the weld comprises aluminium and oxygen in proportions such that [Al]/[O]<2.5, preferably [Al]/[O]<1.5, where [Al] is the proportion of aluminium by weight and [0] is the proportion of oxygen by weight;

the weld includes less than 0.6% molybdenum, less than 80 ppm boron, less than 1% silicon, less than 0.20% carbon, less than 0.035% sulphur and less than 0.035% phosphorus, preferably less than 0.3% molybdenum, less than 50 ppm boron, 0.1 to 0.6% silicon and 0.03 to 0.13% carbon;

the weld comprises less than 0.07% niobium, less than 0.07% vanadium, 1 to 200 ppm nitrogen and less than 1% chromium, preferably less than 100 ppm nitrogen, less than 0.03% niobium, less than 0.05% vanadium and less than 0.3% chromium;

the laser beam assistance gas and/or the arc shielding gas is a gas mixture containing up to 20% oxygen by volume and/or up to 40% $CO_2$ by volume;

the laser beam assistance gas is a gas mixture furthermore containing at least one inert gas, preferably helium, argon or a mixture thereof; and the consumable wire is a solid wire or a cored wire containing at least one element chosen from titanium, manganese, iron, nickel, and optionally boron, molybdenum, carbon or chromium.

The invention also relates to a solid or cored welding wire that can be used in a laser/arc hybrid welding process with supply of consumable welding wire and shielding gas according to the invention, which comprises 100 to 10 000 ppm titanium, 50 to 5000 ppm oxygen and up to 1500 ppm boron, the balance essentially consisting of iron.

In particular, the wire contains one or more alloying elements for ferritic steels, chosen from manganese, silicon, molybdenum, nickel and carbon.

More generally, the welds produced by conventional arc welding processes, with no laser, may have various microstructures, among which there is the structure called acicular ferrite, which exhibits excellent toughness properties.

This type of microstructure is specific to welds and is never encountered in steels, even when they have been subjected to cooling conditions similar to those of welds.

However, in welds, such a microstructure may appear, in certain cases, for a very wide range of cooling rates from the austenitic state, including those which, in the case of conventional steels, result in hardened structures of the martensite and/or lower bainite type, which are hard and brittle, as recalled in the document by M Antunes and C. Bonnet, "Application d'un essai de trempabilité à 1a recherche des facteurs ayant une influence sur 1a formation de ferrite aciculaire [*Application of a hardenability test to the search for factors that have an influence on the formation of acicular ferrite*]", Journées d'information Métallurgie de 1a zone fondue [*Workshop on the metallurgy of the melted zone*], Société Francaise de Métallurgie/Société des Ingénieurs Soudeurs [*French Metallurgy Society/Welder-Engineers Society*], South-west Section, conference No. 9, published by La Soudure Autogène 1981.

Acicular ferrite exists in the melted metal only in the presence of certain inclusions, which act as intragranular nuclei for ferrite during transformation of austenite during cooling.

It is known that the existence of these inclusions depends on the oxygen content of the melted zone but, in order for there to be intragranular nucleation of ferrite upon cooling, it seems that these complex inclusions must have, locally on their surface, titanium oxide TiO or a titanium/manganese oxide $MnTi_2O_4$, as described by R. Blondeau in "*Métallurgie et mécanique du soudage [Metallurgy and mechanics of welding]*", Hermes Science, Lavoisier 2001, page 162.

It is therefore clear that titanium plays a fundamental role.

However, it is not sufficient to have a minimum amount of titanium, typically a few tens of ppm by weight, in order for it to be in one or other of the desired forms.

This is because it is also essential that the kinetics of the oxidation-reduction reactions that lead to the formation of the inclusions allow this result to be achieved.

Thus, in addition to the titanium content and the oxygen content, the nature and the amount of all of the deoxidizing elements, that is to say the elements having a high affinity for oxygen, such as aluminium, silicon, calcium, etc., possibly present in the melted metal will also come into play and have a not insignificant impact on the resulting microstructure, this being so whatever the origin of these elements, namely wire, base metal, gas.

In addition, the nitrogen content must also be involved since, although titanium and aluminium have a high affinity for oxygen, these elements also have a high affinity for nitrogen, so that nitrogen, and also all the elements that have an affinity therefor, such as boron, vanadium, niobium, etc., will interfere in the oxidation-reduction reactions and affect the appearance in the melted metal of the inclusions needed to transform the austenite into acicular ferrite.

However, the melted metal resulting from laser/arc hybrid welding, with or without filler metal, does not in general meet the conditions necessary for acicular ferrite nucleation, so that very often it has a hard, brittle martensite or martensite/bainite microstructure incompatible with a large number of applications.

Taking the foregoing into consideration, the solution of the invention allowing these problems to be alleviated consists in providing, during laser/arc hybrid welding, in the melted metal by means of the wire or preferably the wire/gas pair, the elements allowing the formation of inclusions favourable to the nucleation of acicular ferrite.

However, to do this, it is necessary to take account of the fact that what is important in the end is the chemical composition of the melted metal, which results from mixing between the base metal and the metal deposited by the wire/gas pair used, the proportion of both generally being expressed in welding by the degree of dilution, which is the proportion of base metal in the melted metal, the proportion being that by weight, by volume or by area, determined macrographically since it involves a proportion and since the densities of the base metal and of the deposited metal are virtually the same.

Thus, for example if a weld is produced with a degree of dilution of 80% by weight, the content of each of the elements in the melted metal will be 80% of the content of this element in the base metal to which 20% of the content of this same element is added in the deposited metal by the wire or the wire/gas pair.

Thus, the above shows that the problem is extremely complex.

However, the trials carried out within the context of the present invention, and given below by way of illustration, show that it is possible to propose solutions which work in most cases, that is to say which result in the formation of non-brittle micro-structures in the deposited metal, by adjusting the proportions of certain particular elements within the weld, and therefore also by controlling their relative proportions in the filler materials, especially via the wire/gas pair.

Adjustment of the Oxygen Content of the Melted Metal

Current steels have a very low oxygen content, generally less than 30 ppm by weight, and usually have a residual aluminium content of typically around 100 to 500 ppm by weight, since this element is used as killing element in the smelting of these steels.

Consequently, any oxygen present in these steels is in the form of aluminate inclusions, which are not capable of acting as nuclei for acicular ferrite.

Even by adding titanium via the filler wire, this cannot be in the form of the oxides needed for acicular ferrite nucleation since aluminium is more reactive than titanium with respect to oxygen and, from the very smelting of the steels, it is always in excess relative to the residual oxygen of the steel.

If it is desired to be able to form titanium oxides in the melted metal, it is therefore essential to increase its oxygen content relative to that of the base metal so that, even after reaction with aluminium, oxygen remains in excess so that it can react with the titanium.

Several means can be used separately or in combination in order to supply oxygen to the melted metal:

the assistance gas used for the laser welding may contain oxygen or $CO_2$, the latter decomposing with the release of oxygen owing to the high temperatures existing near the liquid metal during a welding operation; and/or the solid or cored filler wire, the oxygen content of which may be much higher than that of the base metal; thus, a solid wire may contain several hundred ppm of oxygen and a cored wire may contain several thousand ppm thereof; and/or the shielding gas used for the "arc" part, in the case of laser/arc hybrid welding, which, depending on the design of the hybrid welding equipment, may or may not be different from the shielding gas assisting the laser beam.

FIG. 1 shows the variation in laser/arc hybrid welding, more precisely $CO_2$ laser/MAG hybrid welding, of the oxygen content in the melted metal as a function of the oxygen content in the helium and also the oxygen content in the melted metal for the He/8 vol % $CO_2$ mixture using, in all cases, a power of either 6 kW or 8 kW and the same filler metal, consisting of a solid wire 1.2 mm in diameter of the G2Si type according to the EN 440 standard.

Trials were carried out on a weld thickness of 6 mm, at a welding speed of 1 m/min at 6 kW and 1.7 m/min at 8 kW, for a gas flow rate of 30 l/min, for a wire speed of 14 m/min, a current of 370-390 A and a voltage of 39-42 V.

As may be seen in FIG. 1, the proportion of oxygen in the melted metal of a weld obtained by laser/arc hybrid welding increases when the oxygen content in the assistance gas increases.

It may also be seen that, as in the case of laser welding alone or arc welding alone, replacing the oxygen with $CO_2$, in an equivalent amount, results in a smaller increase in the oxygen content in the melted metal.

Complementary tests carried out in parallel show that the amount of oxygen needed in the welds must be between approximately 50 and 1000 ppm, but we shall see later that the lower limit depends in fact on the aluminium content of the melted metal. The upper limit results from the fact that the increase in the oxygen content results in an increase in the density of inclusions in the weld, which results in a reduction in the ductile fracture energy (see R. Blondeau, "Métallurgie et mécanique du soudage", Hermes Science, Lavoisier 2001). It is therefore unnecessary to introduce more oxygen than the amount needed to obtain the inclusions necessary for acicular ferrite nucleation.

Adjustment of the Titanium Content of the Melted Metal

Since titanium is essential, so that the inclusions do actually act as nuclei for converting austenite to acicular ferrite during cooling of the weld, it proves necessary to supply titanium via the bulk or cored wire if the base metal, that is to say the workpiece(s) to be welded, does not contain a sufficient amount of titanium.

Thus, it has been found that, whatever the welding process, no acicular ferrite appears if the titanium content of the melted metal is less than 30 ppm by weight and that above a certain value, which may vary between about 800 and 1000 ppm, the transformation to acicular ferrite is suppressed or greatly limited.

It is therefore necessary that the melted metal, that is to say the mixture of the base metal and the deposited metal in proportion with the degree of dilution, contains between 30 and 1000 ppm, preferably between 50 and 800 ppm, titanium by weight.

Ideally, it is necessary for the chemical composition of the deposited metal, which results from the chemical composition of the wire used and from the reactions with the laser assistance gas and/or the arc shielding gas (see FIG. 1 and Table 5), to contain a sufficient amount of titanium so that, when the deposited metal resulting from the melting of the wire is mixed with the base metal in proportions corresponding to the degree of dilution, the mixture thus obtained has a titanium content of between about 30 and 1000 ppm.

In practice, given that the acceptable titanium content range is relatively broad, to achieve this objective is relatively simple since most base metals do not contain titanium, while for other metals their content is generally less than 200 or 250 ppm.

Under these conditions, it may be seen that if a chemically balanced wire is used for depositing, with the gas used, a metal containing between 150 and 1000 ppm titanium by weight, the mixture with the base metal will have a titanium content in the required range for transformation to acicular ferrite for a degree of dilution between 80% and 0%, if a steel containing no titanium is welded, and whatever the degree of dilution if a steel typically containing less than 800 ppm titanium is welded.

The composition of the deposited metal is never identical to the composition of the wire, and the transfer coefficient for the various elements, that is to say the ratio of the content of this element in the deposited metal to its content in the wire, depends not only on all the elements present in the wire but also, for certain elements, on the nature of the shielding gas.

Thus, if it is desired to have 200 ppm titanium in the deposited metal, the content in the wire will not be the same, depending on the other elements present, such as C, Mn, etc.

In other words, in order for the titanium content of the melted metal to be between 30 and 1000 ppm, preferably between 50 and 800 ppm, it is then necessary, if the base metal diluted in the melted metal does not allow the minimum value to be reached, to provide the necessary titanium by means of the filler wire, taking into account the degree of dilution, as explained above, but also the titanium transfer coefficient, between wire and deposited metal, the transfer coefficient being the ratio of the titanium content of the deposited metal to that of the wire used. This coefficient is always less than 1 and is smaller the higher the oxidative power of the gas used, that is to say that the arc shielding gas in the case of laser/arc hybrid welding contains more oxygen and/or $CO_2$.

Adjustment of the Hardenability of the Melted Metal

The hardenability is a concept well known to metallurgists, which represents the ability of a steel to acquire a 100% martensitic structure.

The hardenability may be characterized especially by the critical quench rate which is the slowest cooling rate from the austenitic state (at high temperature, generally above 900° C. in the case of the steels encountered in welding) that makes it possible to confer a 100% martensitic structure on the steel in question.

It may be determined from continuous cooling transformation (CCT) diagrams which represent, in graphical form, the various structural transformations that a steel undergoes depending on the cooling rate from the austenitic state.

The more the CCT diagram is shifted to the right (longer times) along the temperature/time axes, the lower the critical quench rate and the higher the hardenability of the steel.

Even if the conditions for the inclusions to be able to be active as nuclei for transforming the austenite to acicular ferrite in a weld are met, which depends in particular on the balancing in terms of titanium, aluminium, oxygen, etc., as explained above, it is also necessary, in order for this microstructure to appear, that the austenite not be transformed beforehand into a decomposition product that forms at a temperature above that of acicular ferrite, given that acicular ferrite forms upon cooling between 550 and 450° C.

The reason for this is that certain other microstructural constituents, such as Widmanstatten ferrite, granular bainite or pearlite, may appear at higher temperatures.

It is therefore necessary for the melted metal to have a hardenability sufficient to prevent the austenite from being transformed at a temperature above 550° C. under the cooling conditions specific to laser or laser/arc hybrid welds.

In other words, it is necessary to ensure that the hardenability of the melted metal, resulting from the mixture of the base metal and the deposited metal depending on the degree of dilution, is not too low, in order to prevent the austenite from transforming into coarse, and therefore non-toughening, constituents before reaching the temperature range for transformation to acicular ferrite (below 550° C.), nor too high, so as to prevent the austenite from transforming to martensite, including in the presence of the inclusions conducive to the nucleation of acicular ferrite.

The chemical composition of the filler wire, which obviously has an influence on the hardenability of the melted metal, must therefore be balanced by taking into account the composition of the base metal, the degree of dilution and the transfer coefficients for the various chemical elements which, just as in the case of titanium, depend on the oxidative power of the gas mixture through which the drops of metal pass from the wire into the weld pool during welding.

Although the heat cycles caused by the laser/arc hybrid welding are very rapid compared with the heat cycles caused by more conventional welding processes, such as MIG/MAG, submerged arc, plasma, etc., within the context of the invention, the formation of acicular ferrite has never been observed in weld beads obtained by a laser/arc hybrid process in which the manganese content is less than 0.7%.

It is therefore necessary to meet, in the melted metal, a minimum manganese content of 0.7%, preferably at least 1%.

Furthermore, it has been observed that the presence of complementary alloying elements, such as molybdenum, nickel, chromium or boron, generally increases the portion of acicular ferrite in the molten metal, this being particularly pronounced in the case of boron, especially when it is combined with molybdenum, but very substantial additions may be prejudicial as too high a hardenability of the melted metal will result in a hard, brittle martensitic structure even if the inclusions needed for acicular ferrite nucleation are present.

The distinction made between boron and molybdenum relative to the other alloying elements is explained by the fact that the action of these elements on the hardenability is more pronounced on transformations occurring at high temperature, that is to say above 550° C., which corresponds to the upper part of CCT diagrams, than on those occurring at lower temperature, that is to say below 550° C.

Thus, in addition to the minimum manganese content of 0.7%, preferably 1%, it will be advantageous to introduce boron and/or molybdenum into the melted metal so as to increase the proportion of acicular ferrite in the weld and by the same token the low-temperature toughness.

Adjustment of the Oxygen Content of the Melted Metal

Experiments carried out within the context of the present invention have shown that it is also necessary, in order to obtain a structure rich in acicular ferrite in the weld, and thereby good low-temperature toughness properties, for the Al/O ratio to be less than 2.5, preferably less than 1.5.

This is because, to obtain good low-temperature toughness values in a weld obtained by a laser/arc hybrid process and to avoid having excessively high hardnesses in the melted metal, it is necessary to form, in the melted metal, inclusions that are capable of acting as nuclei so that the transformation of austenite during cooling produces acicular ferrite and, as indicated above, these titanium-rich oxide inclusions can form only if all the oxygen present in the melted metal is not entirely bound to the aluminium, the reactivity of which with respect to oxygen is greater than that of titanium. Experiments have shown that this is the case only if the Al/O weight ratio in the melted metal is less than 2.5.

To meet this condition, the aluminium coming essentially from the dilution of the base metal in the weld, it is necessary to enrich the melted metal with oxygen by means of the wire, the welding gas or the wire/gas combination employed during arc/laser welding.

Trials carried out within the context of the present invention (see below) have shown that excellent ductility, toughness and resilience results, without excessive hardnesses, are obtained in welds produced by carrying out a laser/arc hybrid process when the composition of the melted metal, that is to say of the weld, contains the elements given in Table 1 below (the contents being expressed in proportions by weight).

TABLE 1

| C | Si | Mn | S | P | O | Ti | Ni |
|---|---|---|---|---|---|---|---|
| <0.2% | <1% | 0.7 to 1.8% | <0.035% | <0.035% | 50 to 650 ppm | 30 to 1000 ppm | <10% |

| Mo | Cr | N | B | Nb | V | Al/O |
|---|---|---|---|---|---|---|
| <0.6% | <1% | 10 to 200 ppm | <80 ppm | <0.07% | <0.07% | <2.5 |

However, the welds exhibit better properties when they contain the elements of Table 1 in the preferred proportions shown in Table 2 below (the contents being expressed in proportions by weight.

TABLE 2

| C | Si | Mn | S | P | O | Ti | Ni |
|---|---|---|---|---|---|---|---|
| 0.03 to 0.13% | 0.1 to 0.6% | 0.8 to 1.5% | <0.035% | <0.035% | 70 to 300 ppm | 50 to 500 ppm | <3.5% |

| Mo | Cr | N | B | Nb | V | Al/O |
|---|---|---|---|---|---|---|
| <0.3% | <0.3% | 10 to 100 ppm | <50 ppm | <0.03% | <0.05% | <1.5 |

The compositional ranges shown in Tables 1 and 2 correspond to the melted metal, which results from the composition of the base metal, or of the base metals if two workpieces made of different steels are joined together by welding, and that of the deposited metal, depending on the wire, the gas or the wire/gas pair, and taking the degree of dilution into account.

In practice, to meet these ranges and obtain a weld according to the invention, the following procedure should be implemented.

The composition of the base metal, constituting the workpieces to be joined together (or the workpiece if its edges are to be welded to form a tube), or a mean composition corresponding to those of the two base metals if the workpieces are made of different steels, is determined.

The degree of dilution, that is to say the proportion of base metal in the weld to be produced, is determined.

Next, the composition of the metal to be deposited (wire/gas pair) is determined so that the base metal/deposited metal mixture results in a composition of the melted metal, that is to say of the weld, within the ranges of Table 1 or Table 2 above, taking the determined degree of dilution into account.

Thus, for example if the manganese (Mn) content of the base metal is 1% and the degree of dilution is estimated to be 80%, the preferred manganese range (see Table 2) of between 0.8 and 1.5% in the case of the melted metal is met if the manganese content of the deposited metal (wire/gas pair) is between 0 and 3.5% since, for a 1% Mn content in the base metal (i.e. in the steel of the workpieces to be welded) and a degree of dilution of 80%, a weld, that is to say a melted metal, will be obtained that contains 80% of the Mn resulting from the base metal and therefore 20% of the Mn resulting from the deposited metal (wire/gas pair).

To obtain a weld containing 0.8% Mn (a low value in the range shown in Table 2), it is therefore necessary to use an Mn-free wire (deposited metal), that is to say one containing no Mn. In other words, in this case, all the manganese that will be in the weld comes solely from the steel of workpieces to be welded.

However, to obtain a weld containing 1.5% Mn (the high value of the range shown in Table 2), it is necessary to use a wire/gas pair that results in a deposited metal containing about 3.5% Mn, since in this case 80% of the manganese that will be in the weld comes from the steel of the workpieces to be welded (i.e. 0.8% of the desired 1.5%) and 20% will come from the wire/gas pair (i.e. 0.7% of the desired 1.5%).

A similar calculation may be carried out for each of the chemical elements to be introduced into the weld, thereby allowing a precise definition of the composition of the metal to be deposited, i.e. of the wire/gas pair, according to the workpieces to be welded.

It should be noted that, since the degree of dilution, that is to say the proportion of base metal in the melted metal of the laser welds with the filler wire, is generally around 60 to 80%, the metal deposited by the wire/gas pair, and therefore the filler wire, must contain very little or, on the contrary, a large amount of manganese, depending on the manganese content of the base metal or metals, and usually high titanium and boron contents relative to the intended ranges for the melted metal, so that the low percentage of deposited metal in the weld makes it possible to achieve the middle of the ranges of values recommended for these elements in the weld.

Moreover, as regards the elements Cr, N, V and Nb, in practice there is only very little advantage in having these elements in the weld.

However, their presence is almost inevitable owing to the dilution with the base metal that often contains several of them, or because they are present as inevitable residual impurities in the metals to be joined together, or in the added product, (for example in the case of nitrogen).

It is therefore necessary to ensure that their contents are as low as possible and that they never exceed the maximum values given in Tables 1 and 2 above.

Furthermore, as regards the element Ni, the 10% maximum content given in Table 1 corresponds to the very particular case of 9% nickel steels.

When such steels with a very high nickel content are welded, it is necessary to ensure beforehand that the oxygen content is not too high and, where appropriate, this oxygen content is adjusted so as to make it compatible with the welding of this type of nickel steel, that is to say it is preferred to work with oxygen contents close to the low value of the oxygen range shown in Table 1.

Except for such high-nickel steels, the more conventional steels can be effectively welded while respecting maximum nickel contents in the weld of around 2 to 3% by weight approximately.

Taking the foregoing into consideration, compositional ranges of the metal to be deposited by the wire/gas pair, which make it possible to obtain the compositions of the melted metal of the weld shown in Table 1 or Table 2, have been established. These ranges are given in Table 3.

Preferably, the deposited metal must have a metallurgical composition corresponding to the upper part of the compositional ranges when the degree of dilution of the base metal in the weld is high (greater than 85%). On the other hand, its composition must correspond more to the low part of the ranges indicated when the degree of dilution is significantly lower, for example 75% or less.

TABLE 3

| C | Si | Mn | S | P | O | Ti |
|---|---|---|---|---|---|---|
| <0.15% (pref. < 0.1%) | <0.6% (pref. < 0.1 to 0.5%) | 0.5 to 6% (pref. < 2 to 3%) | <0.035£ (pref. < 0.025%) | <0.035% (pref. < 0.025%) | 50 to 1500 pmm (pref. 100 to 1000 ppm) | 150 to 1000 ppm (pref. 300 to 800 ppm %) |

TABLE 3-continued

| Ni | Mo | Cr | N | B | Nb | V | Al |
|---|---|---|---|---|---|---|---|
| <10% | <0.6% | <1% | 10 to 200 ppm | <80 ppm | <0.07% | <0.07% | <0.02% |

Furthermore, as mentioned above, the composition of the metal deposited by the wire/gas pair used in laser/arc hybrid welding depends on the composition of the wire and of the oxidative power of the gas mixture, since the latter determines the transfer coefficients of the various alloying elements contained in the wire.

In the case of laser/arc hybrid welding, whether of the TIG or plasma type, the filler metal is supplied in the form of a cold consumable wire.

In this case, the chemical exchanges are relatively slight and only significant differences may be noted as regards the oxygen content, which may be increased relative to that of the wire when the latter contains only a small amount (solid wires whose oxygen content is less than 150 ppm) or decreased when the wire contains a great deal, such as for example in the case of certain cored wires of the cored metal type. However, the manganese, silicon and titanium contents are always lower in the deposit than in the wire, the difference being greater the higher the oxidation potential of the laser assistance gas, namely the higher the oxygen and/or $CO_2$ content.

It should be noted that, in TIG and plasma welding, it is not possible to use oxidizing shielding gases as otherwise the tungsten electrode would be destroyed.

However, if the hybrid welding equipment allows there to be two separate gas feeds, one of laser beam assistance gas and the other for the plasma or TIG arc, the laser assistance gas may be different and therefore contain oxygen since, in such a case, this oxidizing gas is not in direct contact with the tungsten electrode.

Likewise, it is also possible to use a dual-flow plasma or dual-flow TIG torch, that is to say torches having two gas circuits, in which the central gas or plasma-generating gas contains no oxygen, whereas the annular gas may contain oxygen as it is not in direct contact with the electrode.

In laser/GMAW hybrid welding, transfer of liquid metal drops takes place from the end of the consumable wire into the weld pool via the arc, which means much more intense chemical exchanges and much more pronounced losses in terms of elements.

Examples of in-arc chemical transfer depending on the nature and the proportion of the oxidizing constituents of the shielding gas with various types of wires are given in Table 4, showing the compositions of the wires and of the deposited metal that are obtained with these wires using shielding gases having different oxidizing components in laser/MAG hybrid welding.

TABLE 4

| Oxidizing components of the shielding gas | | C | Mn | Si | Mo | Ni | Ti | B | N | O |
|---|---|---|---|---|---|---|---|---|---|---|
| Wire: MC1 | — | 0.006 | 1.65 | 1.06 | — | — | 0.11 | 0.0050 | 0.0033 | 0.2350 |
| Deposited | 18% $CO_2$ | 0.011 | 1.33 | 0.88 | — | — | 0.041 | 0.0050 | 0.0045 | 0.0548 |
| metal | 3% $CO_2$ + 1% $O_2$ | 0.010 | 1.45 | 1.02 | — | — | 0.058 | 0.0050 | 0.0046 | 0.0420 |
| Wire: MC2 | — | 0.15 | 1.74 | 0.57 | 0.32 | 0.93 | 0.08 | 0.0009 | 0.0050 | 0.2120 |
| Deposited metal | 10% $CO_2$ | 0.085 | 1.44 | 0.41 | 0.31 | 0.92 | 0.020 | 0.0001 | 0.0055 | 0.0454 |
| Wire: F1 | — | 0.105 | 1.70 | 0.59 | 0.31 | 0.95 | 0.067 | 0.0009 | 0.0066 | 0.0150 |
| Deposited | 18% $CO_2$ | 0.089 | 1.37 | 0.47 | 0.30 | 0.91 | 0.025 | 0.0004 | 0.0073 | 0.0400 |
| metal | 10% $CO_2$ | 0.083 | 1.57 | 0.55 | 0.30 | 0.94 | 0.032 | 0.0004 | 0.0082 | 0.0276 |
|  | 3% $O_2$ | 0.077 | 1.54 | 0.54 | 0.30 | 0.93 | 0.028 | 0.0004 | 0.0074 | 0.0229 |
| Wire: F2 | — | 0.047 | 1.69 | 0.79 | — | — | 0.14 | 0.0010 | 0.0025 | 0.0043 |
| Deposited | 9% $CO_2$ | 0.067 | 1.35 | 0.62 | — | — | 0.069 | 0.0009 | 0.0047 | 0.0271 |
| metal | 1.5% $O_2$ | 0.040 | 1.54 | 0.68 | — | — | 0.080 | 0.0009 | 0.0048 | 0.0214 |

The residual impurity contents are not indicated in Table 4. Moreover, the wires labelled MCx are cored wires without slag and the wires labelled Fx are solid wires.

The results given in Table 4 show very clearly that the composition of the deposited metal is always significantly different from the composition of the wire used, the magnitude of the differences depending on the nature and on the amount of oxidizing gases present in the gas mixture in which the arc is generated.

The more oxidizing the gas mixture, the greater the losses of elements having a high affinity for oxygen, such as manganese, silicon, titanium, etc., whereas the oxygen content in the deposited metal may increase or decrease relative to that of the wire used, depending on the oxygen content of the said wire.

As regards carbon, the result is different depending on the nature of the oxidizing gas and the carbon concentration of the wire used.

When the oxidizing element is oxygen, a reduction in the carbon content of the deposited metal relative to that of the wire is always observed, this decrease being greater the higher the oxygen content of the shielding gas.

When the oxidizing element is $CO_2$, the deposited metal becomes enriched in carbon relative to the wire if the latter has a very low carbon content. On the other hand, a reduction in carbon content is observed in the deposit if the carbon content of the wire is high.

The equilibrium point, that is to say the carbon content of the wire that leads to an identical content in the deposit, is an increasing function of the $CO_2$ content of the shielding gas and is located at around 0.08% by weight of the wire, for a $CO_2$ content of 20% by volume.

The following examples illustrate all the rules mentioned above, which allow the properties of the welds to be improved by the laser/MAG hybrid process.

The three trials were carried out with plates 8 mm in thickness from one and the same batch, the chemical composition of which is given in Table 6.

These trials differ from one another firstly by the nature of the shielding gas and secondly by the nature of the filler wire used. In the three cases, the shot power of the $CO_2$ laser used was 8 kW, the welding speed was 2.1 m/min and the electric arc parameters were adjusted in order to obtain the same rate of deposition whatever the wire used. In fact, as indicated above, two wires were used for these trials, which had a diameter of 1.2 mm, but one being a solid wire and the other a metal-powder-cored wire. These wires do not have the same density, which meant that a higher wire speed was used in the case of the cored wire than for the solid wire as it was desired to have the same rate of deposition with both wires.

This difference between the cored wire and the solid wire also means that the currents for obtaining these same rates of deposition were not the same. Since a cored wire has a higher electrical resistance than a solid wire of the same diameter, its rate of melting for a given current is higher than that of a solid wire (the current flows via the metal casing of the cored wire, which of course has a smaller cross section than that of the solid wire of the same diameter and therefore a higher resistance).

Consequently, the current needed to melt the same mass of wire per unit time (rate of deposition) is lower for the cored wire than for the solid wire. The electrical parameters are also adjusted in order to obtain the same arc length, whatever the shielding gas employed; this means using a slightly higher welding voltage when the shielding gas contains no active component, that is to say oxygen in this case.

All the welding conditions for the welds W27, W29 and W34 are given in Table 5.

TABLE 5

| Specimen | Gas | Wire | $P_{laser}$ (kW) | $V_{weld}$ (m/min) | $V_{wire}$ (m/min) | Current (A) | Voltage (V) |
|---|---|---|---|---|---|---|---|
| W27 | (70% He + 30% Ar) + 3% $O_2$ | FA7 | 8 | 2.1 | 9.2 | 321 | 34.2 |
| W29 | (70% He + 30% Ar) + 3% $O_2$ | MC20 | 8 | 2.1 | 9.8 | 292 | 34.2 |
| W34 | (70% He + 30% Ar) | FA7 | 8 | 2.1 | 9.2 | 321 | 35.4 |

The chemical analyses of the plates used, of the wires and of the three welds are given in Table 6 together with the hardness values in the base metal and the welds.

TABLE 6

| Elements (wt %) | Plate (8 mm thick) | MZ W27 | MZ W29 | MZ W34 | FA7 solid wire | MC20 cored wire |
|---|---|---|---|---|---|---|
| C | 0.11 | 0.10 | 0.10 | 0.11 | 0.057 | 0.092 |
| Si | 0.006 | 0.12 | 0.13 | 0.24 | 0.72 | 0.75 |
| Mn | 1.45 | 1.44 | 1.46 | 1.45 | 1.33 | 2.08 |
| P | 0.011 | 0.013 | 0.014 | 0.018 | 0.021 | 0.011 |
| S | 0.008 | 0.009 | 0.012 | 0.016 | 0.025 | 0.008 |
| Cr | 0.028 | 0.031 | 0.027 | 0.039 | 0.057 | 0.048 |
| Mo | <0.001 | <0.001 | <0.001 | 0.005 | 0.015 | <0.001 |
| Ni | 0.036 | 0.035 | 0.031 | 0.036 | 0.040 | 0.027 |
| Al | 0.031 | 0.025 | 0.021 | 0.023 | — | 0.007 |
| Co | 0.010 | 0.009 | 0.009 | 0.007 | 0.005 | 0.008 |
| Cu | 0.009 | 0.024 | 0.023 | 0.043 | 0.13 | 0.09 |
| Nb | 0.038 | 0.026 | 0.023 | 0.029 | 0.004 | <0.001 |
| Ti | 0.002 | 0.001 | 0.007 | 0.003 | 0.002 | 0.053 |
| V | 0.001 | <0.001 | <0.001 | 0.004 | 0.002 | <0.001 |
| B | 0.0003 | 0.0001 | 0.0016 | 0.0007 | 0.0008 | 0.0055 |
| N | 0.0040 | 0.0098 | 0.0062 | 0.0057 | 0.0076 | 0.0042 |
| O ppm | 0.0022 | 0.0310 | 0.0250 | 0.0030 | 0.0280 | 0.2420 |
| Al/O | 14.1 | 0.81 | 0.84 | 7.7 | — | 0.03 |
| Hv 0.5 Hardness | 175 | 253 | 250 | 302 | — | — |

In this Table 6, comparison between the welds W34 and W27 shows that the addition of an oxidizing component in the shielding gas results in an increase in the oxygen content in the melted metal, which is manifested by a very substantial decrease in its hardness, which thus approaches that of the base metal and gives the weld more uniform properties.

It may also be seen, by comparing weld W29, obtained by combining the oxidizing gas with the MC20 cored wire, with weld W27 obtained using the FA7 solid wire combined with the same oxidizing gas, that although the MC20 cored wire has a much higher manganese content than the FA7 solid wire, the manganese contents of the welds W27, W29 are very similar. This results in the fact that the cored contains much less oxygen than the solid wire and that this oxygen significantly reduces manganese transfer from the wire into the deposited metal.

It may also be seen that, compared with the FA7 solid wire, the cored wire contains titanium and boron, which are partly found in the weld W29, the difference between the wire and the weld deriving not only from the transfer coefficient for these elements, which is very similar to unity, but also from the dilution with the base metal, the welds being composed, on the one hand, of the base metal, and on the other hand, of the deposited metal in proportion with the degree of dilution, as explained above.

Finally, it may be seen that, despite this additional presence of titanium and boron, elements that normally have the effect of increasing the hardenability of the steel, the hardness of welded joint W29 is slightly less than that of joint W27 that contains none of them.

This is all perfectly consistent with the foregoing and is in fact reflected in the change in microstructure of the weld owing to the presence of oxygen, which increases the amount of inclusions and thus decreases the hardenability by trapping some of the alloying elements (welds W34 and W27), and owing to the presence of titanium, which allows these inclusions to act as nuclei for transformation of the austenite to acicular ferrite during cooling when the Al/O ratio is less than 2.5 (welds W27 and W29), as may be seen in FIG. 2, which shows the macrography, the microstructures and the hardnesses of these three welds.

FIG. 2 also gives the toughness values at −40° C. measured with reduced Charpy V-notched test specimens of 5×10 mm, the thickness of the assembled plates not allowing the use of standard 10×10 mm test specimens.

These −40° C. toughness values, like the transition curves shown in FIG. 3, illustrate the improvement in toughness of the welds when the oxygen content of the melted metal increases, which allows the transformation of austenite to acicular ferrite by supplying titanium and oxygen and by complying with the Al/O ratio indicated above, these three conditions proving to be essential for nucleation of this acicular ferrite, the fineness of which is the cause of the good toughness properties.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for welding at least one ferritic steel workpiece with a laser beam and an electric arc that are combined together, said method comprising:
   a) supplying a consumable welding wire and a shielding gas;
   b) melting said consumable welding wire with the laser beam and the electric arc that are combined together; and
   c) producing a weld on the at least one ferritic steel workpiece, in the presence of said shielding gas mixture, wherein said weld comprises:
      1) titanium in an amount, by weight, of about 30 ppm to about 1000 ppm;
      2) manganese in an amount, by weight, of at least 0.7%;
      3) oxygen in an amount, by weight, of about 50 ppm to about 1000 ppm;

4) nickel in an amount, by weight, of less than about 10%;
5) wherein said weld further comprises aluminum in an amount, by weight, of less than about 1500 ppm, the ratio of the amount of aluminum in said weld to the amount of oxygen in said weld, by weight, being less than about 2.5, and
6) wherein the microstructure of said weld is rich in acicular ferrite.

2. The method of claim 1, wherein said weld has an acicular ferrite microstructure.

3. The method of claim 1, wherein said weld comprises titanium in an amount, by weight, of about 30 ppm to about 800 ppm.

4. The method of claim 3, wherein said weld comprises titanium in an amount, by weight, of about 50 ppm to about 500 ppm.

5. The method of claim 1, wherein said weld comprises oxygen in an amount, by weight, of about 100 ppm to about 450 ppm.

6. The method of claim 5, wherein said weld comprises oxygen in an amount, by weight, of about 120 ppm to about 350 ppm.

7. The method of claim 1, wherein said weld comprises manganese in an amount, by weight, of about 0.7% to about 2%.

8. The method of claim 7, wherein said weld comprises manganese in an amount, by weight, of about 0.8% to about 1.7%.

9. The method of claim 1, wherein said weld comprises aluminum in an amount, by weight, of less than about 300 ppm.

10. The method of claim 1, wherein said weld comprises:
   a) titanium in an amount, by weight, of about 50 ppm to about 500 ppm;
   b) oxygen in an amount, by weight, of about 120 ppm to about 350 ppm;
   c) manganese in an amount, by weight, of about 0.8% to about 1.7%; and wherein said weld further comprises
   d) aluminum in an amount, by weight, of less than about 300 ppm.

11. The method of claim 1, wherein said ratio is less than about 1.5.

12. The method of claim 1, wherein said weld further comprises:
   a) molybdenum in an amount, by weight, of less than about 0.6%;
   b) boron in an amount, by weight, of less than about 80 ppm;
   c) silicon in an amount, by weight, of less than about 1%;
   d) carbon in an amount, by weight, of less than about 0.20%;
   e) sulfur in an amount, by weight, of less than about 0.035%; and
   f) phosphorus in an amount, by weight, of less than about 0.035%.

13. The method of claim 12, wherein said weld comprises:
   a) molybdenum in an amount, by weight, of less than about 0.3%;
   b) boron in an amount, by weight, of less than about 50 ppm;
   c) silicon in an amount, by weight, of about 0.1% to about 0.6%; and
   d) carbon in an amount, by weight, of about 0.03% to about 0.13%.

14. The method of claim 1, wherein said weld further comprises:
   a) niobium in an amount, by weight, of less than about 0.07%;
   b) vanadium in an amount, by weight, of less than about 0.07%;
   c) nitrogen in an amount, by weight, of about 1 ppm to about 200 ppm;
   d) chromium in an amount, by weight, of less than about 1%.

15. The method of claim 14, wherein said weld comprises:
   a) niobium in an amount, by weight, of less than about 0.03%;
   b) vanadium in an amount, by weight, of less than about 0.05%;
   c) nitrogen in an amount, by weight, of about 1 ppm to about 100 ppm; and
   d) chromium in an amount, by weight, of less than about 0.3%.

16. The method of claim 1, wherein said gas mixture comprises at least one member selected from the group consisting of:
   a) oxygen, wherein the volume of said oxygen is less than about 20% of the total gas mixture volume; and
   b) carbon dioxide, wherein the volume of said carbon dioxide is less than about 40% of said total gas mixture volume.

17. The method of claim 16, wherein said gas mixture further comprises at least one inert gas.

18. The method of claim 17, wherein said inert gas comprises at least one member selected from the group consisting of:
   a) helium;
   b) argon; and
   c) a helium and argon mixture.

19. The method of claim 1, wherein said consumable welding wire comprises at least one member selected from the group consisting of:
   a) solid wire; and
   b) cored wire.

20. The method of claim 19, wherein said welding wire contains at least one element selected from the group consisting of:
   a) titanium;
   b) manganese;
   c) iron;
   d) nickel;
   e) boron;
   f) molybdenum;
   g) carbon; and
   h) chromium.

* * * * *